(12) United States Patent
Lian et al.

(10) Patent No.: US 12,215,424 B2
(45) Date of Patent: Feb. 4, 2025

(54) METAL RESIN COMPOSITE, PREPARATION METHOD THEREOF, AND ELECTRONIC PRODUCT HOUSING HAVING THE SAME

(71) Applicant: BYD COMPANY LIMITED, Shenzhen (CN)

(72) Inventors: Junlan Lian, Shenzhen (CN); Hongye Lin, Shenzhen (CN); Fan Chen, Shenzhen (CN); Weitu Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 759 days.

(21) Appl. No.: 17/280,318

(22) PCT Filed: Sep. 10, 2019

(86) PCT No.: PCT/CN2019/105097
§ 371 (c)(1),
(2) Date: Mar. 26, 2021

(87) PCT Pub. No.: WO2020/063324
PCT Pub. Date: Apr. 2, 2020

(65) Prior Publication Data
US 2022/0002876 A1 Jan. 6, 2022

(30) Foreign Application Priority Data
Sep. 28, 2018 (CN) .............................. 201811142235

(51) Int. Cl.
*C23C 18/16* (2006.01)
*B29C 45/14* (2006.01)
*B29K 705/00* (2006.01)
*B29L 31/34* (2006.01)
*C23C 18/31* (2006.01)

(52) U.S. Cl.
CPC .... *C23C 18/1689* (2013.01); *B29C 45/14778* (2013.01); *C23C 18/31* (2013.01); *B29K 2705/00* (2013.01); *B29L 2031/34* (2013.01)

(58) Field of Classification Search
CPC . C23C 18/1689; C23C 18/31; C23C 18/1651; C23C 18/38; C23C 18/1844; C23C 18/32; C23C 18/52; B29K 2705/02; B29K 2705/10; B29K 2995/0094; B29K 2995/0097; B29K 2705/00; B32B 2255/205; B32B 2307/538; B32B 2307/54; B32B 2457/00; B32B 2605/08; B32B 2605/18; B32B 15/08; B32B 15/082; B32B 15/085; B32B 15/088; B32B 15/09; B32B 15/095; B32B 15/18; B32B 15/20; B32B 27/281; B32B 27/285; B32B 27/286; B32B 27/288; B32B 27/302; B32B 27/304; B32B 27/308; B32B 27/32; B32B 27/34; B32B 27/36; B32B 27/365; B32B 27/40; B32B 2250/02; B32B 2255/06; B29C 45/14311; B29C 45/0001; B29C 45/0005; B29C 45/0053; B29C 45/14; B29C 45/77; B29C 45/78; B29C 2945/76498; B29C 2945/76531; B29C 2045/14868; B29C 45/14778; C25D 11/08; H05K 5/00
See application file for complete search history.

(56) References Cited

U.S. PATENT DOCUMENTS

| | | | | |
|---|---|---|---|---|
| 5,858,813 | A * | 1/1999 | Scherber | H01L 21/3212 438/693 |
| 11,697,232 | B2* | 7/2023 | Kondo | B32B 27/281 428/141 |
| 2003/0041968 | A1* | 3/2003 | Saito | H01L 21/67051 156/345.12 |
| 2004/0197594 | A1 | 10/2004 | Suzuki | |
| 2010/0304171 | A1* | 12/2010 | Tomantschger | B32B 15/043 156/60 |
| 2016/0139449 | A1* | 5/2016 | Zhang | G02B 6/0081 428/1.62 |
| 2016/0207148 | A1* | 7/2016 | Kobayashi | B23K 26/00 |
| 2016/0221235 | A1* | 8/2016 | Yu | B29C 45/14311 |
| 2016/0297124 | A1* | 10/2016 | Su | B23K 26/34 |
| 2019/0001441 | A1* | 1/2019 | Gu | B29C 66/919 |
| 2020/0223113 | A1* | 7/2020 | Kondo | B32B 15/095 |
| 2020/0262173 | A1* | 8/2020 | Jung | B29C 65/8215 |
| 2020/0325626 | A1* | 10/2020 | Pihko | D21H 27/10 |
| 2021/0010151 | A1* | 1/2021 | Curran | B32B 15/08 |
| 2022/0002876 | A1* | 1/2022 | Lian | C23C 18/1689 |
| 2022/0355524 | A1* | 11/2022 | Tang | B32B 7/12 |

(Continued)

FOREIGN PATENT DOCUMENTS

| | | |
|---|---|---|
| CN | 102950837 A | 3/2013 |
| CN | 103297565 A | 9/2013 |
| CN | 103459679 A | 12/2013 |

(Continued)

OTHER PUBLICATIONS https://maf.com/2016/11/26/electro-plating-vs-electroless-plating/ (herein referred to as MAF; published 2016).*
Laser Interference Patterning and Laser-induced Periodic Surface Structure Formation on Metallic Substrates (Y. Zheng, Z. An, P. Smyrek, H.J. Seifert, W. Pfleging) (IEEE International CONference on Manipulation, Manufacturing, and Measurement on theNanoscale) (Jul. 2016) (Year: 2016).*
LIPSS (Year: 2016).*
The World Intellectual Property Organization (WIPO) International Search Report for PCT/CN2019/105097 Dec. 4, 2019 6 Pages.

(Continued)

*Primary Examiner* — Kevin R Kruer
(74) *Attorney, Agent, or Firm* — Wenye Tan

(57) ABSTRACT

A metal resin composite includes a metal substrate, a metal layer formed on a surface of the metal substrate, and a resin layer formed on the metal layer. A plurality of microcracks are formed at a surface of the metal layer.

9 Claims, No Drawings

(56) References Cited

U.S. PATENT DOCUMENTS

2023/0137503 A1* 5/2023 Chen .................. C23C 14/20
                                                                                         428/209

FOREIGN PATENT DOCUMENTS

| CN | 104309192 A | 1/2015 |
|---|---|---|
| CN | 104309204 A | 1/2015 |
| CN | 104608317 A | 5/2015 |
| CN | 104780241 A | 7/2015 |
| CN | 105538596 A | 5/2016 |
| CN | 105587994 A | 5/2016 |
| CN | 106696172 A | 5/2017 |
| CN | 206455884 U | 9/2017 |
| EP | 0329406 A1 | 8/1989 |
| JP | 2010064397 A | 3/2010 |
| KR | 20180025426 A | 3/2018 |

OTHER PUBLICATIONS

Zhang, et al., Electroplating Handbook, National Defence Industry Press ISBN 78-7-118-07752-0, p. 532-533, Dec. 31, 2011.

Hu, et al., Micro machining technology and process of mechanical and electrical products, Guangdong Science & Technology Press, ISBN 7-5359-0957-4, p. 320-321, Feb. 28, 1993.

Yuan, et al., Materials and production technology of modish ornament, China University of Geosciences Press, ISBN 978-7-5625-3630-7, p. 22-27, Jun. 30, 2015.

* cited by examiner

METAL RESIN COMPOSITE, PREPARATION METHOD THEREOF, AND ELECTRONIC PRODUCT HOUSING HAVING THE SAME

CROSS-REFERENCE TO RELATED APPLICATIONS

This application is a national phase entry under 35 U.S.C. § 371 of International Application No. PCT/CN2019/105097, filed on Sep. 10, 2019, which claims priority to Chinese Patent Application No 201811142235.9 filed by the BYD Co., Ltd. on Sep. 28, 2018, and entitled METAL-RESIN COMPLEX, PREPARATION METHOD THEREFOR, AND ELECTRONIC PRODUCT SHELL, the entire content of all of which is incorporated herein by reference in its entirety.

FIELD

The present disclosure relates to the field of metal resin materials, and in particular, to a metal resin composite and a preparation method thereof, and an electronic product housing prepared by using the metal resin composite.

BACKGROUND

In the fields of IT electronics, communication, automobile industrial manufacturing, aerospace and the like, the bonding of a metal piece and a resin is commonly used. The most conventional method is using a binder for connection, but the robustness and reliability of the binder are limited.

A second method is an emerging technology in the recent years, which is mainly an application of bonding the aluminum alloy with the resin. A chemical method, T treatment, is used for forming micropores on aluminum alloy materials, and the resin is bonded to the treated aluminum alloy by an injection molding method. The bonding strength of the method is strong, but the method can only be applied to aluminum alloy.

A third method is as shown in patent CN104608317, in step 1, a microporous layer is deposited on a metal surface via an electric deposition method, wherein the microporous layer is provided as a metal nickel microporous layer or a metal nickel alloy microporous layer; in step 2, the resin is bonded to the metal surface processed in step 1 by an injection molding process, thus obtaining a bonded body of metal and resin. The disadvantages of treatment with such a method are that the plating layer is formed by the electric deposition method, which may affect the bonding strength of the bonded body of metal and resin.

A fourth method is as shown in patent CN105587994, a plurality of metal posts are formed on a surface of a metal piece by a plating treatment. A plastic piece is filled between every two adjacent metal posts and covers the surface of the metal piece such that the plastic piece can be bonded to the metal piece. Bonding by such a method results in limited specific contact surface area due to post connection, and without the assistance of a riveting force, the bonding strength is relatively poor.

SUMMARY

An objective of the present disclosure is to overcome the foregoing problems existing in the prior art, and to provide a metal resin composite with good bonding strength, wide material applicability, and strong applicability to product shapes, as well as a preparation method thereof.

To achieve the foregoing objective, a first aspect of the present disclosure provides a metal resin composite, wherein the metal resin composite includes a metal substrate, a metal layer formed on a surface of the metal substrate, and a resin layer formed on the metal layer. A plurality of microcracks are formed at a surface of the metal layer.

According to a second aspect of the present disclosure, a preparation method for a metal resin composite is provided. The preparation method includes:
1) forming a metal layer on a metal substrate;
2) forming the metal layer with a plurality of microcracks; and
3) forming a resin layer on the metal layer.

The present disclosure further provides an electronic product housing, which is prepared from the metal resin composite of the present disclosure.

According to the present disclosure, a metal resin composite with good bonding strength, wide material applicability, and strong applicability to product shapes as well as a preparation method thereof can be provided.

Other features and advantages of the present disclosure will be described in detail in the following detailed description section.

DETAILED DESCRIPTION

Endpoints of all ranges and all values disclosed herein are not limited to the precise ranges or values, and these ranges or values should be understood as including values close to these ranges or values. For value ranges, one or more new ranges of values can be obtained by combining the endpoint values of each range, combining the endpoint values of each range with individual point values, and combining the individual point values. These numerical ranges should be construed as being specifically disclosed in the present disclosure.

According to a first aspect of the present disclosure, a metal resin composite is provided. The metal resin composite includes a metal substrate, a metal layer formed on a surface of the metal substrate, and a resin layer formed on the metal layer. A plurality of microcracks are formed at a surface of the metal layer. It should be noted that, the "microcracks" herein can be understood as elongated fine grooves formed on the surface of the metal layer.

According to the metal resin composite of the present disclosure, in some embodiments, the width of the microcracks may be below 2000 nm. In some embodiments, from the perspective of further improving a bonding force between metal and resin, the width of the microcracks may be 10-1000 nm. In some embodiments, the width of the microcracks may be 65-600 nm, and further may be 65-490 nm, and further may be 65-370 nm, and further may be 110-370 nm, and further may be 230-370 nm.

Specific examples of the above width of the microcracks may be, for example: 10 nm, 50 nm, 65 nm, 100 nm, 110 nm, 120 nm, 130 nm, 140 nm, 150 nm, 160 nm, 170 nm, 200 nm, 210 nm, 220 nm, 230 nm, 250 nm, 260 nm, 270 nm, 280 nm, 290 nm, 300 nm, 310 nm, 320 nm, 330 nm, 340 nm, 350 nm, 360 nm, 370 nm, 390 nm, 400 nm, 450 nm, 500 nm, 550 nm, 600 nm, 700 nm, 800 nm, 900 nm, 1000 nm, and 2000 nm, or a value between any two of the foregoing values.

In some embodiments, the depth of the microcracks is 200-6000 nm. In some other embodiments, from the perspective of further improving the bonding force between metal and resin, the depth of the microcracks may be 500-5000 nm. In some embodiments, the depth of the microcracks may be 700-4000 nm, and further may be 700-3800 nm, and further may be 700-3000 nm, and further may be 1200-3000 nm, and further may be 2000-3000 nm.

Specific examples of the above depth of the microcracks may be, for example: 200 nm, 300 nm, 400 nm, 500 nm, 550 nm, 600 nm, 650 nm, 680 nm, 700 nm, 720 nm, 750 nm, 800 nm, 850 nm, 900 nm, 1000 nm, 1100 nm, 1200 nm, 1300 nm, 1500 nm, 1800 nm, 2000 nm, 2200 nm, 2400 nm, 2600 nm, 2800 nm, 3000 nm, 3500 nm, 4000 nm, 5000 nm, and 6000 nm, or a value between any two of the foregoing values.

In some embodiments, a ratio of the depth of the microcracks to the thickness of the metal layer may be 1:1.3-10, and further may be 1:1.4-5.

The above ratio of the depth of the microcracks to the thickness of the metal layer may be, for example: 1:10, 1:9, 1:8, 1:7, 1:6, 1:5, 1:4.5, 1:4, 1:3, 1:2.5, 1:2 or 1:1.5, 1:1.25 or 1:1.4, etc.

In an embodiment of the present disclosure, the width of the microcracks is 220-370 nm, and the depth of the microcracks is 2000-3000 nm. By setting the width and the depth of the microcracks in the above range, the bonding force between metal and resin can be further significantly improved.

According to the metal resin composite of the present disclosure, from the perspective of further improving the bonding force between metal and resin, in some embodiments, the resin layer extends into at least a part of the microcracks; and further, the resin layer may extend into all the microcracks.

In the present disclosure, by the resin layer extending to the microcracks, the metal and the resin form an interlocking structure, which can significantly improve the bonding force between the metal and the resin.

According to the metal resin composite of the present disclosure, the plurality of microcracks may be connected to each other, or may not be connected to each other. In some embodiments, at least a part of the plurality of microcracks are connected to each other and form a network. By connecting at least a part of the plurality of microcracks to each other and forming a network, the bonding force between the metal and the resin can be further improved.

As set forth in the background, in the existing art, for an application of bonding the aluminum alloy with the resin, a chemical method, T treatment, is used for forming micropores on aluminum alloy materials, and the resin is bonded to the treated aluminum alloy by an injection molding method. The bonding strength of the method is strong, but the method can only be applied to aluminum alloy. In contrast, the structure of the metal resin composite of the present disclosure can be applied to many types of metal, which has an advantage of wide material applicability. Specifically, in the present disclosure, the metal substrate is stainless steel, aluminum alloy, magnesium alloy or copper alloy, and the like.

The thickness of the above metal substrate is not particularly limited, for example, the thickness may be 0.1-100 mm.

According to the metal resin composite of the present disclosure, the metal layer can be formed through chemical treatment or physical treatment. In some embodiments, the metal layer is a metal plating layer. Further, the metal layer may be a nickel plating layer, a copper plating layer, or a tin plating layer. Further, the metal plating layer may be an electroless nickel plating layer, an electroless copper plating layer, or an electroless tin plating layer; and more preferably, the metal plating layer is an electroless nickel plating layer.

The above chemical treatment may be electroless plating, and the above physical treatment may be vapor deposition or electroless plating.

In some embodiments, the thickness of the above metal layer may be 100-10000 nm, and further may be 200-10000 nm. In some embodiments, the thickness of the above metal layer may be 500-10000 nm, and further may be 1000-9000 nm, and further may be 2000-8000 nm.

According to the metal resin composite of the present disclosure, the thickness of the resin layer is not particularly limited, and is defined according to structure requirements. Herein, the thickness of the resin layer does not include the thickness of the part extending into the microcracks.

According to the metal resin composite of the present disclosure, the resin layer of the present disclosure is formed by injection molding a resin composition. Specific examples of the resin may include but are not limited to: one or more of polyolefin (such as polystyrene, polyethylene, polyvinyl chloride, polypropylene, polymethyl methacrylate and poly (acrylonitrile-butadiene-styrene)), polycarbonate, polyester (such as polycyclohexylenedimethylene terephthalate, poly (diallyl isophthalate), poly(diallyl phthalate), polybutylene naphthalate, polyethylene terephthalate and polybutylene terephthalate), polyamide (such as polyphthalamide, polyhexamethylene adipamide, polyhexamethylene azelamide, polyhexamethylene succinamide, polyhexamethylene dodecanediamide, polyhexamethylene sebacamide, polydecamethylene sebacamide, polyundecamide, polydodecamide, polyoctamide, poly-9-aminononanoic acid, polycaprolactam, poly(p-phenylene terephthamide), polyhexamethylene isophthalamide, polyhexamethylene terephthalamide and polynonamethylene terephthalamide), polyarylether, polyetherimide, polyphenylene ether, polyphenylene sulfide, polyimide, polysulfone, polyether ether ketone, and polyurethane. In some embodiments, the resin may be selected from at least one of polyamide, polyphenylene sulfide, polybutylene terephthalate, and polyether ether ketone.

The content of the above resin in the resin composition may be a conventional amount in the art, for example, 50-100 wt. %, and preferably 70-85 wt. %.

According to the metal resin composite of the present disclosure, the resin composition may further include at least one auxiliary agent such as a filler, an antioxidant, a light stabilizer and a lubricant as needed to improve the properties of the resin layer obtained from the resin composition or to impart new properties to the resin layer. The content of the auxiliary agent may be appropriately selected according to the type and specific use requirements, and is not particularly limited.

In some embodiments, the filler may be a material that can adjust a thermal expansion coefficient of the resin, for example, may be glass fibers and/or carbon fibers.

The antioxidant can improve the oxidation resistance of the resin layer, thereby prolonging the service life of the metal resin composite. The antioxidant may be various antioxidants commonly used in the field of polymers, and may, for example, contain a primary antioxidant and a secondary antioxidant. A relative amount of the primary antioxidant and the secondary antioxidant can be appropriately selected according to the type. Generally, a weight ratio of the primary antioxidant to the secondary antioxidant may be 1:1-4. The primary antioxidant may be a hindered phenol antioxidant, and specific examples thereof may include, but are not limited to, Antioxidant 1098 and Antioxidant 1010, wherein the main component of the Antioxidant 1098 is N,N'-bis-(3-(3,5-di-tert-butyl-4-hydroxyphenyl)propionyl) hexamethylenediamine, and the main component of the Antioxidant 1010 is pentaerythritol tetrakis(3-(3,5-di-tert-butyl-4-hydroxyphenyl)propionate). The secondary antioxidant may be a phosphite type antioxidant, and specific examples thereof may include, but are not limited to, Antioxidant 168, the main component of which is tris(2,4-di-tert-butylphenyl)phosphite.

The light stabilizer may be various light stabilizers, such as a hindered amine light stabilizer, and specific examples thereof may include, but are not limited to, bis(2,2,6,6-tetramethyl-4-piperidinyl) sebacate.

The lubricant may be various materials capable of improving the fluidity of the resin composition, and may be, for example, one or more selected from ethylene/vinyl acetate copolymerized wax (EVA wax), polyethylene wax (PE wax) and stearate.

The content of the auxiliary agent may be appropriately selected according to the function and type of the auxiliary agent. Generally, based on the weight of the resin composition, the content of the filler may be 30-50 wt. %, the content of the antioxidant may be 0.3-1 wt. %, the content of the light stabilizer may be 0.2-1 wt. %, and the content of the lubricant may be 0.1-1 wt. %.

According to a second aspect of the present disclosure, a preparation method for a metal resin composite is provided. The method includes: 1) forming a metal layer on a metal substrate;

2) forming the metal layer with a plurality of microcracks; and 3) forming a resin layer on the metal layer.

According to the preparation method for the metal resin composite of the present disclosure, the metal layer may be formed on the metal substrate by an electroless plating method. The electroless plating method may be implemented because by forming the metal plating layer on the metal substrate using the electroless plating method, applicability to product shapes can be strong, and by forming the metal plating layer on the metal substrate using the electroless plating method, there can be no impact caused by the uniformity of plating layer thicknesses.

In some embodiments, the metal layer may be a nickel plating layer, a copper plating layer, or a tin plating layer, that is, in step 1), a nickel plating layer, a copper plating layer, or a tin plating layer is preferably formed on the metal substrate.

In addition, in an embodiment of the present disclosure, in step 1), an electroless nickel plating layer, an electroless copper plating layer, or an electroless tin plating layer is formed on the metal substrate by an electroless plating method.

In some embodiments, the electroless nickel plating layer may be an electroless nickel plating layer containing phosphorus in a phosphorus content of 1-3 wt. %.

According to the preparation method for the metal resin composite of the present disclosure, in some embodiments, step 2) includes contacting the metal layer on the metal substrate obtained in step 1) with a treating agent containing an acid. From the perspective of promoting formation of the cracks, preferably, the treating agent further contains an oxidizing agent, that is, step 2) includes contacting the metal layer on the metal substrate obtained in step 1) with a treating agent containing an acid and an oxidizing agent.

In some embodiments, the acid may be one or more of sulfuric acid, hydrochloric acid, hydrogen fluoride, nitric acid, and phosphoric acid.

In some embodiments, the oxidizing agent may be one or more of ferric chloride, copper chloride, persulfate, hydrogen peroxide, peroxydisulfuric acid, perphosphoric acid, and peracetic acid.

In some embodiments, the content of acid in the treating agent may be 10-500 g/L, and further may be 50-200 g/L.

In some embodiments, the content of oxidizing agent in the treating agent may be 10-800 g/L, and further may be 300-700 g/L.

In addition, a solvent of the treating agent may be, such as, water.

According to the preparation method for the metal resin composite of the present disclosure, the contact is acceptable as long as it can form the microcracks. In some embodiments, the contact conditions include a contact temperature of 20-70° C. and a contact time of 0.1-5 min. In some embodiments, the contact conditions include a contact temperature of 30-50° C. and a contact time of 0.5-3 min.

The approaches for the above contact are not particularly limited, for example, the metal substrate obtained in step 1) may be soaked in the treating agent.

According to the preparation method for the metal resin composite of the present disclosure, in some embodiments, the width of the formed microcracks is below 2000 nm. In some other embodiments, from the perspective of further improving the bonding force between metal and resin, the width of the formed microcracks may be 10-1000 nm. In some embodiments, the width of the formed microcracks may be 65-600 nm, and further may be 65-490 nm, and further may be 65-370 nm, and further may be 110-370 nm, and further may be 230-370 nm.

Specific examples of the above width of the formed microcracks may be, for example: 10 nm, 50 nm, 65 nm, 100 nm, 110 nm, 120 nm, 130 nm, 140 nm, 150 nm, 160 nm, 170 nm, 200 nm, 210 nm, 220 nm, 230 nm, 250 nm, 260 nm, 270 nm, 280 nm, 290 nm, 300 nm, 310 nm, 320 nm, 330 nm, 340 nm, 350 nm, 360 nm, 370 nm, 390 nm, 400 nm, 450 nm, 500 nm, 550 nm, 600 nm, 700 nm, 800 nm, 900 nm, and 1000 nm, or a value between any two of the foregoing values.

In some embodiments, the depth of the formed microcracks may be 200-6000 nm. In some other embodiments, from the perspective of further improving the bonding force between metal and resin, more preferably, the depth of the formed microcracks may be 500-5000 nm. In some embodiments, the depth of the formed microcracks may be 700-4000 nm, and further may be 700-3800 nm, and further may be 700-3000 nm, and further may be 1200-3000 nm, and further may be 2000-3000 nm.

Specific examples of the above width of the formed microcracks may be, for example: 200 nm, 300 nm, 400 nm, 500 nm, 550 nm, 600 nm, 650 nm, 680 nm, 700 nm, 720 nm, 750 nm, 800 nm, 850 nm, 900 nm, 1000 nm, 1100 nm, 1200 nm, 1300 nm, 1500 nm, 1800 nm, 2000 nm, 2200 nm, 2400 nm, 2600 nm, 2800 nm, 3000 nm, 3500 nm, 4000 nm, 5000 nm, and 6000 nm, or a value between any two of the foregoing values.

In some embodiments, a ratio of the depth of the microcracks to the thickness of the metal layer may be 1:1.3-10, and further may be 1:1.4-5.

The above ratio of the depth of the microcracks to the thickness of the metal layer may be, for example: 1:10, 1:9, 1:8, 1:7, 1:6, 1:5, 1:4.5, 1:4, 1:3, 1:2.5, 1:2 or 1:1.5, 1:1.25 or 1:1.4, etc.

In an embodiment of the present disclosure, the width of the formed microcracks is 220-370 nm, and the depth of the formed microcracks is 2000-3000 nm. By setting the width and the depth of the formed microcracks in the above range, the bonding force between metal and resin can be significantly improved.

According to the preparation method for the metal resin composite of the present disclosure, in some embodiments, the preparation method further includes performing passivation treatment after contacting the metal layer on the metal substrate obtained in step 1) with a treating agent containing an acid.

The conditions of the above passivation treatment include: a passivation temperature of 15-80° C., and a passivation time of 1-5 min. In addition, a plating passivator used in the passivation treatment may be properly selected according to different systems. The selection method of the plating passivator is known in the art, and details are herein omitted for simplification.

As set forth in the background, in the existing art, for an application of bonding the aluminum alloy with the resin, a chemical method, T treatment, is used for forming micropores on aluminum alloy materials, and the resin is bonded to the treated aluminum alloy by an injection molding method. The bonding strength of the method is strong, but the method can only be applied to aluminum alloy. In contrast, the preparation method for the metal resin composite of the present disclosure can be applied to many types of metal, which has an advantage of wide material applicability. Specifically, in the present disclosure, the metal substrate is stainless steel, aluminum alloy, magnesium alloy or copper alloy, and the like.

The thickness of the above metal substrate is not particularly limited, for example, the thickness may be 0.1-100 mm.

In some embodiments, the thickness of the metal layer of the present disclosure may be 100-10000 nm, and further may be 200-10000 nm, and further may be 500-10000 nm, and further may be 1000-9000 nm, and further may be 2000-8000 nm.

According to the preparation method for the metal resin composite of the present disclosure, in some embodiments, step 3) includes injection molding a resin composition on the metal layer to form the resin layer.

The resin contained in the above resin composition may be thermoplastic resin or thermosetting resin. Specific examples of the resin may include but are not limited to: one or more of polyolefin (such as polystyrene, polyethylene, polyvinyl chloride, polypropylene, polymethyl methacrylate and poly(acrylonitrile-butadiene-styrene)), polycarbonate, polyester (such as polycyclohexylenedimethylene terephthalate, poly(diallyl isophthalate), poly(diallyl phthalate), polybutylene naphthalate, polyethylene terephthalate and polybutylene terephthalate), polyamide (such as polyphthalamide, polyhexamethylene adipamide, polyhexamethylene azelamide, polyhexamethylene succinamide, polyhexamethylene dodecanediamide, polyhexamethylene sebacamide, polydecamethylene sebacamide, polyundecamide, polydodecamide, polyoctamide, poly-9-aminononanoic acid, polycaprolactam, poly(p-phenylene terephthamide), polyhexamethylene isophthalamide, polyhexamethylene terephthalamide and polynonamethylene terephthalamide), polyarylether, polyetherimide, polyphenylene ether, polyphenylene sulfide, polyimide, polysulfone, polyether ether ketone, and polyurethane. Preferably, the resin is selected from at least one of polyimide, polyphenylene sulfide, and polybutylene terephthalate.

The content of the above resin in the resin composition may be a conventional amount in the art, for example, 50-100 wt. %. In some embodiments, it can be 70-85 wt. %.

According to the preparation method of the present disclosure, the resin composition may further include at least one auxiliary agent such as a filler, an antioxidant, a light stabilizer and a lubricant as needed to improve the properties of the resin layer obtained from the resin composition or to impart new properties to the resin layer. The content of the auxiliary agent may be appropriately selected according to the type and specific use requirements, and is not particularly limited.

In some embodiments, the filler may be a material that can adjust a thermal expansion coefficient of the resin, for example, may be glass fibers and/or carbon fibers.

The antioxidant can improve the oxidation resistance of the resin layer thereby prolonging the service life of the metal resin composite. The antioxidant may be various antioxidants commonly used in the field of polymers, and may include, for example, a primary antioxidant and a secondary antioxidant. A relative amount of the primary antioxidant and the secondary antioxidant can be appropriately selected according to the type. Generally, a weight ratio of the primary antioxidant to the secondary antioxidant may be 1:1-4. The primary antioxidant may be a hindered phenol antioxidant, and specific examples thereof may include, but are not limited to, Antioxidant 1098 and Antioxidant 1010, wherein the main component of the Antioxidant 1098 is N,N'-bis-(3-(3,5-di-tert-butyl-4-hydroxyphenyl)propionyl) hexamethlenediamine, and the main component of the Antioxidant 1010 is pentaerythritol tetrakis(3-(3,5-di-tert-butyl-4-hydroxyphenyl)propionate). The secondary antioxidant may be a phosphite type antioxidant, and specific examples thereof may include, but are not limited to, Antioxidant 168, the main component of which is tris(2,4-di-tert-butylphenyl) phosphite.

The light stabilizer may be various light stabilizers, such as a hindered amine light stabilizer, and specific examples thereof may include, but are not limited to, bis(2,2,6,6-tetramethyl-4-piperidinyl) sebacate.

The lubricant may be various materials capable of improving the fluidity of the resin composition, and may be, for example, one or more selected from ethylene/vinyl acetate copolymerized wax (EVA wax), polyethylene wax (PE wax) and stearate.

The content of the auxiliary agent may be appropriately selected according to the function and type of the auxiliary agent. Generally, based on the weight of the resin composition, the content of the filler may be 30-50 wt. %, the content of the antioxidant may be 0.3-1 wt. %, the content of the light stabilizer may be 0.2-1 wt. %, and the content of the lubricant may be 0.1-1 wt. %.

The injection molding conditions are not particularly limited, and may be conventional conditions in the art. In some embodiments, the injection molding conditions may include a mold temperature of 100° C.-250° C. and a holding pressure of 40-250 bar; and further, the injection molding conditions may include a mold temperature of 120° C.-220° C. and a holding pressure of 80-150 bar.

The present disclosure will be illustrated in detail hereafter through examples, but the present disclosure is not limited to the following examples.

In the following examples, the thickness of a plating layer, the width of cracks, and the depth of cracks are measured by using a metallographic sectioning method: cutting a sample, and measuring the thickness of a plating layer, the width of cracks, and the depth of cracks.

A pull strength test method is as follows: the metal resin composite prepared in the examples is fixed to a universal material testing machine for a product tensile test, and a maximum load in the testing result is considered as the magnitude of the bonding force between the metal and the resin.

Examples 1-7

A substrate was treated according to treatment processes set forth in Table 1 (Examples 1-6, for treating stainless steel) and Table 2 (Example 7, for treating aluminum alloy). The procedures of the Examples differed in nickel plating, crack forming and passivation, specific conditions thereof were as shown in Table 1 and Table 2, and metal resin composites A1-A7 were obtained respectively. In addition, the thickness of a plating layer, the width of cracks, the depth of cracks, injection molding resin and pull strength were also as shown in Table 3.

TABLE 1

| Procedure | Chemicals | Temperature | Time | Note |
|---|---|---|---|---|
| Oil removing | Sodium hydroxide 80 g/L Sodium carbonate 50 g/L | 50° C. | 10 min | |
| Acid cleaning | Hydrochloric acid 200 ml/L | Room temperature | 1 min | |
| Strike nickel-plating | Nickel sulfate 200 g/L Hydrochloric acid 100 ml/L | Room temperature | 5 min | Cathode-current density 5 A/dm$^2$ |
| Electroless nickel-plating | MID LP Ni 100 | 88° C. | Refer to Examples | |
| Crack forming | Hydrochloric acid 80 ml/L Ferric chloride 400 g/L | Room temperature | Refer to Examples | |
| Passivation | Chromic anhydride 3 g/L Phosphoric acid 10 g/L | Room temperature | 5 min | |
| Drying | — | 80 | 20 min | |
| Note: | deionized water was required for each step of the procedures for washing | | | |

Note:
chemical reagents used in oil removing, acid cleaning, strike nickel-plating, crack forming, and passivation were all aqueous solutions.

TABLE 2

| Procedure | Chemicals | Temperature | Time | Note |
|---|---|---|---|---|
| Oil removing | Sodium hydroxide 80 g/L Sodium carbonate 50 g/L | 50° C. | 10 min | |
| Alkaline etching | Sodium hydroxide 50 g/L | 50° C. | 30 s | |
| Acid etching | Aqueous solution of concentrated nitric acid Aqueous solution of hydrofluoric acid | Room temperature | 30 s | |
| First zinc depositing | Zinc oxide 20 g/L Sodium hydroxide 120 g/L Ferric chloride 50 g/L Sodium nitrate 1 g/L | Room temperature | 60 s | |
| Zinc removing | Aqueous solution of nitric acid | Room temperature | 30 s | |
| Second zinc depositing | The same as the first zinc depositing | Room temperature | 30 s | |
| Nickel preplating | Electroless nickel 1111 | Room temperature | 8 min | |
| Electroless nickel-plating | MID LP Ni 100 | 88° C. | 25 min | |
| Crack forming | Hydrochloric acid 80 ml/L Ferric chloride 400 g/L | Room temperature | 60 s | |
| Passivation | Chromic anhydride 3 g/L Phosphoric acid 10 g/L | Room temperature | 5 min | |
| Drying | — | 80 | 20 min | |
| Note: | deionized water was required for each step of the procedures for washing | | | |

Note:
chemical reagents used in oil removing, alkaline etching, acid etching, zinc depositing, zinc removing, crack forming, and passivation were all aqueous solutions. A chemical reagent used in the acid etching: a mixed solution obtained by mixing a 68 wt. % aqueous solution of concentrated nitric acid and a 35 wt. % aqueous solution of hydrofluoric acid in a volume ratio of 1:1. A chemical reagent used in the zinc removing: an aqueous solution of nitric acid obtained by mixing a 68 wt. % aqueous solution of concentrated nitric acid and water in a volume ratio of 1:1.

TABLE 3

| Procedure | Example 1 | Example 2 | Example 3 | Example 4 | Example 5 | Example 6 | Example 7 |
|---|---|---|---|---|---|---|---|
| Substrate | Stainless steel 316 | Stainless steel 316 | Stainless steel 316 | Stainless steel 316 | Stainless steel 316 | Stainless steel 316 | Aluminum alloy 3003 |
| Electroless nickel-plating | 5 min | 25 min | 25 min | 40 min | 40 min | 25 min | 25 min |
| Crack forming | 0.5 min | 1 min | 1.5 min | 3 min | 4 min | 5 min | 1 min |
| Passivation | No passivation | Chemical passivation | Chemical passivation | Cathodically electrolytic passivation | Cathodically electrolytic passivation | Chemical passivation | Chemical passivation |
| Thickness of a plating layer | 1000 nm | 5000 nm | 5000 nm | 8000 nm | 8000 nm | 5000 nm | 5000 nm |
| Width of cracks | 65 nm | 110 nm | 230 nm | 370 nm | 490 nm | 600 nm | 220 nm |
| Depth of cracks | 700 nm | 1200 nm | 2000 nm | 3000 nm | 3800 nm | 4000 nm | 2100 nm |
| Injection molding resin | PPA | PPA | PPA | PPA | PPA | PPA | PPA |
| Pull strength | 25 MPa | 35 MPa | 40 MPa | 30 MPa | 20 MPa | 15 MPa | 43 MPa |

In Table 3, % represents wt. %, and PPA represents polyphthalamide.

The method of resin injection molding: a metal coupon was inserted into an injection molding mold, and injection molded with resin. After demolding and cooling, a metal resin composite of a metal and resin composition was obtained in which an end of resin and an end of metal are robustly bonded together (the contact area of the ends of the resin and the metal was 3*1 mm). During the injection molding, a mold temperature was 200° C., and a holding pressure was 90 bar.

Comparative Example 1

An aluminum alloy resin composite was prepared in this example

A substrate was selected to be 5052
1. Pretreatment: the same as Example 1, oil removing was conducted for 10 min, and acid cleaning was conducted for 1 min;
2. Surface treatment 1: as an anode, the aluminum alloy was put in an anodizing tank containing $H_2SO_4$ with a concentration of around 20 wt %. Electrolysis was conducted for 10 min at a voltage of 20 V and at 20° C., and the aluminum alloy was blow-dried;
3. Surface treatment 2:500 ml of an aqueous solution (pH=10.2) having 75 g of $NH_3$ and 27 g of $NH_4Cl$ was prepared in a beaker, at 20° C. The obtained aluminum alloy was soaked in the aqueous solution, and removed after 5 min, the obtained aluminum alloy was soaked in a tank containing water for 1 min, and this process was repeated for 5 times. The aluminum alloy was dried; and
4. Injection molding: the same as the Examples, the tensile strength of the obtained metal resin composite is 35 Mpa.

Comparative Example 2

1. Pretreatment: the same as Example 1, oil removing was conducted for 10 min, and acid cleaning was conducted for 1 min;
2. Surface treatment 1: as an anode, the stainless steel was put in an anodizing tank containing $H_2SO_4$ with a concentration of around 20 wt % as in the Examples. Electrolysis was conducted for 10 min at a voltage of 20 V and at 20° C., and the stainless steel was blow-dried;
3. Surface treatment 2:500 ml of an aqueous solution (pH=10.2) having 75 g of $NH_3$ and 27 g of $NH_4Cl$ was prepared in a beaker, at 20° C. The obtained stainless steel was soaked in the aqueous solution, and removed after 5 min, the obtained stainless steel was soaked in a tank containing water for 1 min, and this process was repeated for 5 times. The stainless steel was dried; and
4. Injection molding: the same as the Examples, no metal resin composite could be obtained, that is, the tensile strength is 0 Mpa.

The preferred embodiments of the present disclosure have been described in detail above, but the present disclosure is not limited thereto. Within the scope of the technical concept of the present disclosure, various simple variations, including the combination of the technical features in any other suitable manner, may be made to the technical solutions of the present disclosure. Such simple variations and combinations shall also be considered as the content disclosed by the present disclosure and shall all fall within the scope of the present disclosure.

What is claimed is:

1. A preparation method for a metal resin composite, comprising:
    forming a metal layer on a metal substrate;
    forming a plurality of microcracks on a surface of the metal layer by contacting the metal layer on the metal substrate with a treating agent containing an acid and an oxidizing agent, wherein each microcrack is an elongate groove along the surface of the metal layer, and a depth of the microcracks is 2000-3000 nm and a width of the microcracks is 230-370 nm; and
    forming a resin layer on the metal layer,
    wherein at least a part of the plurality of microcracks are connected to each other and form an interconnected network of microcracks.

2. The preparation method according to claim 1, wherein forming the metal layer on the metal substrate comprises:
    forming a metal plating layer on the metal substrate.

3. The preparation method according to claim 2, wherein forming the metal layer on the metal substrate further comprises:
    forming a nickel plating layer, a copper plating layer, or a tin plating layer on the metal substrate.

4. The preparation method according to claim 3, wherein forming the metal layer on the metal substrate further comprises:
    forming an electroless nickel plating layer, an electroless copper plating layer, or an electroless tin plating layer on the metal substrate by an electroless plating method.

5. The preparation method according to claim 4, wherein the electroless nickel plating layer is an electroless nickel plating layer containing phosphorus in a phosphorus content of 1-3 wt. %.

6. The preparation method according to claim 1, wherein:
    the acid is one or more of: sulfuric acid, hydrochloric acid, hydrogen fluoride, nitric acid, and phosphoric acid; and
    the oxidizing agent is one or more of: ferric chloride, copper chloride, persulfate, hydrogen peroxide, peroxydisulfuric acid, perphosphoric acid, and peracetic acid.

7. The preparation method according to claim 1, wherein:
    a content of acid in the treating agent is 10-500 g/L;
    a content of oxidizing agent in the treating agent is 10-800 g/L;
    contact conditions comprise: a contact temperature of 20-70° C., and a contact time of 0.1-5 min.

8. The preparation method according to claim 1, wherein forming the resin layer on the metal layer comprises:
    injection molding a resin composition on the metal layer to form the resin layer.

9. The preparation method according to claim 8, wherein the resin in the resin composition is selected from one or more of: polyester, polyamide, polyether ether ketone, polyolefin, polycarbonate, polyarylether, polyetherimide, polyphenyl ether, polyphenylene sulfide, polyimide, polysulfone, and polyurethane.

* * * * *